United States Patent
Jones (10) Patent No.: US 7,301,680 B1
(45) Date of Patent: Nov. 27, 2007

(54) REDUCTION OF ARTIFACTS IN A SCANNING DEVICE

(75) Inventor: Arlin R. Jones, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/395,262

(22) Filed: Sep. 14, 1999

(51) Int. Cl.
*H04N 1/04* (2006.01)
*H04N 1/36* (2006.01)

(52) U.S. Cl. .................. 358/496; 358/486; 358/488; 358/474; 358/498; 358/412; 358/413

(58) Field of Classification Search .............. 358/486, 358/488, 496, 498, 296, 442, 444, 404, 474, 358/406, 412, 497, 468, 413; 271/3.02; 250/557.25; 399/367, 370; 382/312, 318, 319
See application file for complete search history.

(56) References Cited

U.S. PATENT DOCUMENTS

| | | | | |
|---|---|---|---|---|
| 4,367,493 A * | 1/1983 | Matteson | ..................... | 358/496 |
| 4,748,514 A * | 5/1988 | Bell | ........................... | 358/486 |
| 4,908,664 A * | 3/1990 | Ogura | ........................ | 399/204 |
| 5,369,504 A | 11/1994 | Walker | | |
| 5,444,555 A * | 8/1995 | Ono | ............................ | 358/494 |
| 5,473,445 A | 12/1995 | Takei et al. | .................. | 358/474 |
| 5,499,804 A * | 3/1996 | Harada et al. | ............. | 271/3.02 |
| 5,719,404 A | 2/1998 | Tsai | ....................... | 250/559.29 |
| 5,805,294 A * | 9/1998 | Furuoya | ..................... | 358/296 |
| 5,864,408 A * | 1/1999 | Kumashiro | .................. | 358/461 |
| 5,915,158 A * | 6/1999 | Minagawa et al. | ......... | 358/498 |
| 6,160,636 A * | 12/2000 | Nagano | ..................... | 358/412 |
| 6,369,918 B1 | 4/2002 | Tom et al. | | |
| 6,388,777 B1 * | 5/2002 | Miyajima | ................... | 358/488 |
| 6,615,115 B1 | 9/2003 | Huang | | |
| 6,934,058 B2 * | 8/2005 | Kageyama et al. | ......... | 358/497 |

* cited by examiner

*Primary Examiner*—Cheukfan Lee
(74) *Attorney, Agent, or Firm*—Gregg W. Wisdom (57) ABSTRACT

Stopping and starting the movement of media in a scanner before completion of scanning can generate artifacts in the display of the scanned image. These artifacts arise from measurements made during the deceleration of the media before stopping and the acceleration of the media after starting. By scanning the regions that pass the optical sensor during deceleration and acceleration of the media while the media is moving relative to the optical sensor at a substantially constant speed, the degree to which artifacts are produced is reduced. The scanning of the sections of the media corresponding to the deceleration and acceleration distances of the media can be done by moving the optical sensor while the media is stationary, or, by moving the media while the optical sensor is stationary.

7 Claims, 7 Drawing Sheets

REDUCTION OF ARTIFACTS IN A SCANNING DEVICE

FIELD OF THE INVENTION

This invention relates generally to scanning devices. More particularly, this invention relates to an apparatus and method to reduce artifacts generated in a scanning device.

BACKGROUND OF THE INVENTION

In scanning devices that move an object to be scanned relative to a fixed optical sensor, it is sometimes necessary to stop and then restart the movement of the object before scanning of the object is complete. Stopping the movement of the object may be necessary because of memory capacity limitations or transmission bandwidth limitations between a host and the scanning device. The scanning device generates an electronic representation of an image on the surface of the object. The stopping and starting of the object can generate artifacts. These artifacts could appear as defects in the display of the scanned image. A need exists for a low cost and easily implemented system, and method for using this system, that will reduce the severity of the artifacts generated by the stopping or starting of the movement of the object.

SUMMARY OF THE INVENTION

Accordingly, a method for using a scanning device, has been developed. The method includes decelerating an object from moving at a first substantially constant speed to a stop. The method also includes causing relative movement between the object and an optical sensor. The method further includes measuring reflected light from a first section of the object that moved past the optical sensor during decelerating the object.

A system for reducing artifacts from scanning an object includes a moving mechanism to selectively move the object at a first substantially constant speed during scanning. The system also includes a scanning mechanism including an optical sensor. The scanning mechanism is configured to selectively move the optical sensor at a second substantially constant speed during scanning. The optical sensor is configured for measuring reflected light from the object. The system further includes a controller coupled to the moving mechanism and the scanning mechanism. The controller is configured to actuate the moving mechanism to selectively move the object. The controller is also configured to actuate the scanning mechanism to selectively move the optical sensor.

A scanning device for generating a digital representation of an image on media includes a scanning mechanism including an optical sensor. The scanning mechanism is configured for selectively moving at a first substantially constant speed during scanning. The scanning device further includes a moving mechanism configured for selectively moving the media at a second substantially constant speed during scanning. The scanning device also includes a controller coupled to the scanning mechanism and the moving mechanism. The controller is configured to actuate the scanning mechanism to move the optical sensor. The controller is also configured to actuate the moving mechanism to move the media.

DESCRIPTION OF THE DRAWINGS

A more thorough understanding of embodiments of the invention may be had from the consideration of the following detailed description taken in conjunction with the accompanying drawings in which:

Shown in FIG. 1 is a perspective view of the scanner including an embodiment of a system for reducing artifacts.

Shown in FIG. 2 is a simplified cross sectional view of the scanner including an embodiment of the system for reducing artifacts.

Shown in FIG. 3A is a diagram showing the speed of the object while moving at a substantially constant speed, during acceleration, and during deceleration.

Shown in FIG. 3B is a diagram showing the speed of the optical sensor while moving at a substantially constant scanning speed, during acceleration, and during deceleration.

Shown in FIGS. 4A–4C is a diagram showing the movement of an arbitrary point during deceleration and subsequent acceleration of the object.

Shown in FIG. 5 is a high level flow diagram of a first method for reducing artifacts.

Shown in FIG. 6 is a high level flow diagram of a second method for reducing artifacts.

DETAILED DESCRIPTION OF THE DRAWINGS

The invention is not limited to the exemplary embodiment disclosed in this specification. Although the reduction of artifacts will be discussed in the context of a scanner using an internal media feeding mechanism, it should be recognized that the principles disclosed in this specification are applicable to other scanning devices that move an object relative to an optical sensor, such as a scanner that uses an external automatic document feeder.

Figure 1:
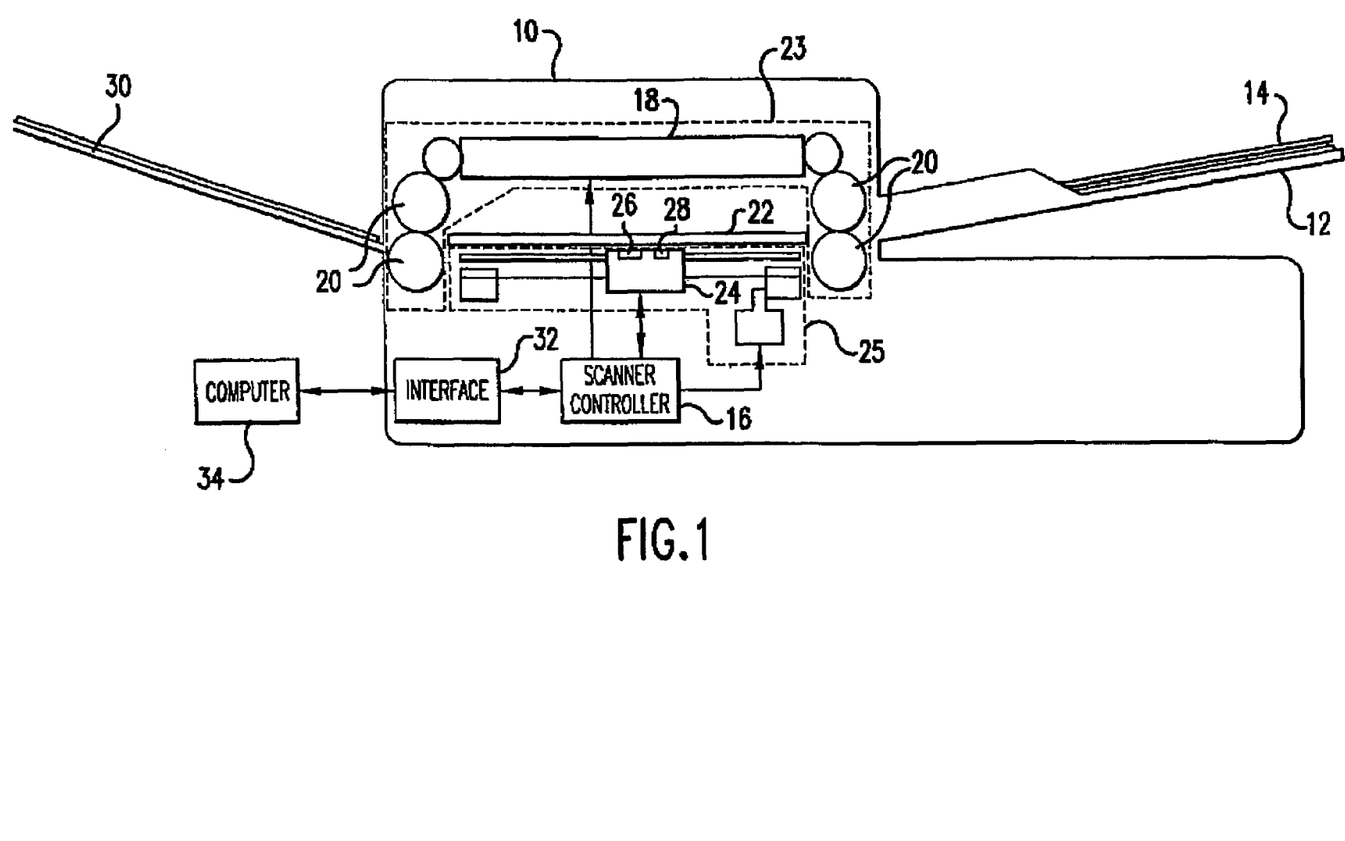

Shown in FIG. 1 is a simplified cross sectional view of an embodiment of a scanning device, scanner 10. Media input tray 12 holds an object to be scanned, such as media 14. Upon receiving a command from an embodiment of a controller, such as scanner controller 16, motor and gear train 18 (shown schematically as a block with protruding drive rollers) begin to rotate. Rotation of motor and gear train 18 causes media drive rollers 20 to rotate thereby pulling a leading edge of media 14 onto transparent surface 22. Drive rollers 20 and motor and gear train 18 form an embodiment of a moving mechanism 23 that moves media 14 across transparent surface 22 at a substantially constant speed when scanning is performed. As used in this specification, the term "substantially constant speed" means a speed having a range of possible values determined by all the possible sources of variability that can cause the speed to deviate from its nominal value. The embodiment of the moving mechanism 23 can be actuated to selectively move media 14 by receiving a command from scanner controller 16.

As media drive rollers 20 continue to rotate, media 14 is moved across transparent surface 22. As the leading edge of media 14 arrives at scan head 24, illumination device 26 included in scan head 24 illuminates the surface of media 14 facing transparent surface 22. Illumination device 26 is typically illuminated sufficiently ahead of scanning to allow stabilization of its optical output. An optical sensor, such as contact image sensor 28, included in scan head 24 measures the reflected light from the surface of media 14 when it moves across transparent surface 22. This reflected light includes information for the image on the surface of media 14.

Scan head 24, and the associated hardware necessary for moving scan head 24, are included in an embodiment of a scanning mechanism 25. The embodiment of the scanning mechanism 25 can be actuated to selectively move scan head 24 (thereby moving contact image sensor 28) at a substantially constant speed when scanning is performed by receiving a command from scanner controller 16. The embodiment of the scanning mechanism 25 can move scan head 24 either in a direction media 14 moves through scanner 10 during scanning or in a direction opposite to that media 14 moves through scanner 10 during scanning.

Contact image sensor 28 includes an array of light sensing elements that each generates a charge related to the intensity of light impinging upon the light sensing element. Contact image sensor 28 further includes the analog multiplexers, shift registers, and addressing logic necessary to generate output voltages corresponding to the charges generated on the light sensing elements. Scanner controller 16 includes the hardware to generate the signals needed for accessing the light sensing elements in contact image sensor 28. In addition, scanner controller 16 includes the hardware necessary to convert the voltages received from contact image sensor 28 into an electronic representation of the reflected light impinging upon contact image sensor 28 from media 14. This electronic representation can be formed of digital data generated by scanner controller 16 from the voltages received from contact image sensor 28. Furthermore, scanner controller 16 includes DRAM for storing the digital data. Alternatively, the memory in scanner controller 16 could include SRAM. In yet another alternative, scanner controller 16 could include a hard disk drive for storing the digital data generated by scanner controller 16.

Contact image sensor 28 is configured to measure the reflected light from a strip across the width of media 14. Media 14 is advanced at a substantially constant speed across transparent surface 22 by the embodiment of the moving mechanism 23. As media 14 advances across transparent surface 22, contact image sensor is continuously measuring the light reflected from media 14. Scanner controller 16 periodically accesses contact image sensor 28 to measure the voltages generated by the light sensing elements in contact image sensor 28. The frequency with which scanner controller 16 measures the voltages output by contact image sensor 28 is set so that scanner controller 16 collects data for successive strips, with each of the strips contiguous with the strip following it and the strip preceding it. Digital data is generated from the voltage values collected by scanner controller 16. In this manner scanner 10 generates an electronic representation of the image on the surface of media 14 facing transparent surface 22 during scanning. After completion of a scan on media 14, media drive rollers 20 move media 14 to media output tray 30. The electronic representation of the image on media 14 could be sent through interface 32 to computer 34 for further image processing and display, or printing. Alternatively, scanner 10 could send the data forming the electronic representation of the image directly to a printing or display device or, over a network to a computer, printer, or display device.

If the movement of media 14 across transparent surface 22 does not stop during a scan, the resulting electronic representation of the image on media 14 will not include artifacts resulting from the stopping and starting of media 14 before completion of the scan. However, limitations in the memory included in scanner controller 16, or data transmission rate through interface 32, or a combination of these factors, may make it necessary to stop the movement of media 14 before completion of the scan. To reduce hardware costs, the size of the memory included in scanner controller 16 and the maximum transmission rate of interface 32 may be limited. As a result, for scanners having this limitation, if the transfer of the digital data stored in scanner controller 16 through interface 32 to computer 34 cannot occur at a sufficiently high rate, the movement of media 14 across transparent surface 22 must be stopped so that the digital data generated by scanner controller 16 can be stored. Another condition that may require stopping of media 14 is a limitation in the ability of computer 34 to receive the digital data transmitted through interface 32. For example, the interface in computer 34 may not be able to receive the digital data at a sufficiently high rate to match the transmission rate of scanner 10. After a sufficient quantity of digital data has been transferred from the memory in scanner controller 16 through interface 32 to computer 34, the memory space created allows restarting of the movement of media 14 for completing the scan.

Because of the mechanical characteristics associated with the embodiment of the moving mechanism 23 (such as motor inertia, gear inertia, and gear lash), a significant distance (significant relative to the image resolution of scanner 10) is required for deceleration of media 14 from the substantially constant speed during scanning across transparent surface 22 to a stop. Similarly, a significant distance is also required for acceleration of media 14 from stopped to the substantially constant speed at which scanning is normally performed. If digital data is collected from contact image sensor 28 during the period of deceleration or acceleration of media 14, distortions in the digital data generated by scanner 10 can result. During periods of acceleration and deceleration, less of the surface of media 14 is scanned than is scanned when media 14 is moving at the substantially constant speed set for scanning. When the digital data is displayed, areas of the scanned image corresponding to the acceleration or deceleration of media 14 will be displayed (for example, by printing or on a computer monitor) assuming that the digital data collected from these regions was collected while media 14 was moving at the substantially constant speed. However, because the digital data collected from these regions is actually collected over a smaller area than assumed, some distortion in the displayed image on the surface of media 14 will result. These distortions appear as artifacts in the reproduction of the image on the surface of media 14. These artifacts take the form of discontinuities (such as a white line or double image in a contone field, or an offset in a text character) in the displayed image.

Figure 2:
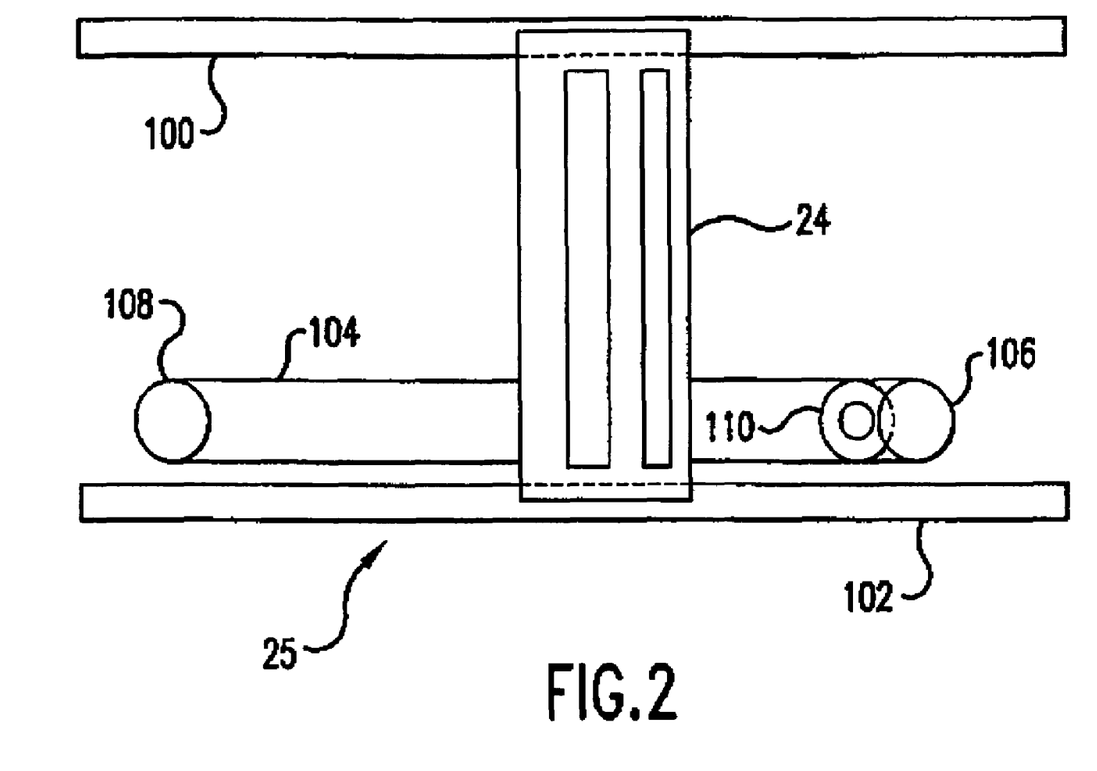

Shown in FIG. 2 is an enlarged view of the embodiment of the scanning mechanism 25. Scan head 24 is mounted on first guide 100 and second guide 102 to permit movement of scan head 24 along first guide 100 and second guide 102 below transparent surface 22. First guide 100 and second guide 102 are substantially parallel. Endless belt 104 is coupled to scan head 24 by, for example, attachment to scan head 24. Endless belt 104 includes teeth and is formed from a flexible but substantially inelastic material, such as woven polyester fibers. Endless belt 104 loops around drive gear 106 and toothed pulley 108. The teeth on endless belt 104 mesh with the teeth of drive gear 106. Motor 110 is coupled to drive gear 106. Motor 110 is a stepper motor to permit highly accurate positioning of scan head 24. Control of the rotational position of motor 110 is performed by scanner controller 16.

Scan head 24 is moved by rotating motor 110. Rotation of motor 110 causes rotation of drive gear 106 thereby pulling endless belt 104 around toothed pulley 108. Movement of endless belt 104 in turn pulls scan head 24 along first guide 100 and second guide 102. Motor 110 includes the capability to rotate clockwise and counterclockwise. Accordingly, scan head 24 may be moved either toward the left end of first guide 100 and second guide 102 or toward the right end of first guide 100 and second guide 102. Motor 110 and the gear reduction achieved through drive gear 106, and the gear on motor 110 with which it meshes, is sufficient to allow the positioning of scan head 24 with a step increment on the order of the pixel resolution of scanner 10. When scanning of media 14 is performed without stopping media 14 before completion of the scan, scan head 24 will remain stationary at substantially the midpoint of its possible range of travel between the ends of first guide 100 and second guide 102 as media 14 is moved across transparent surface 22 during scanning.

Figure 3A:
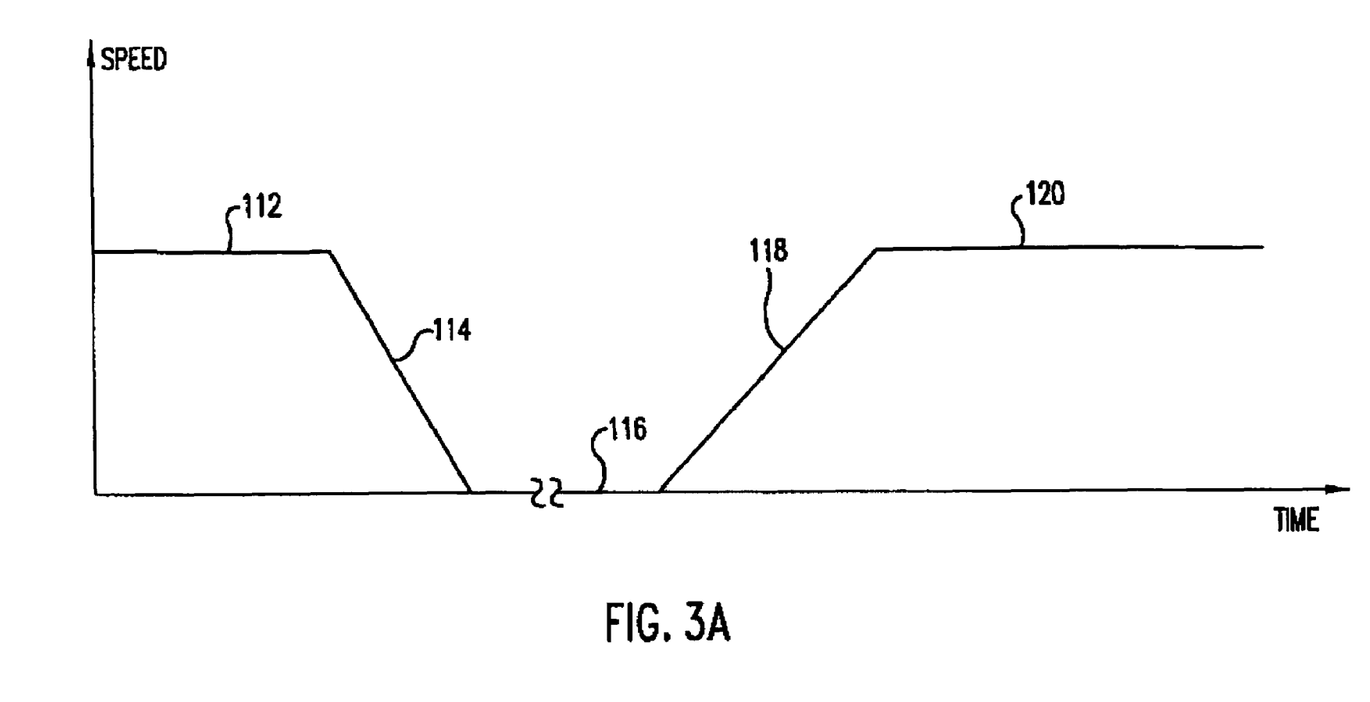

Shown in FIG. 3A is a graph representative of the speed of media 14 as it undergoes deceleration and acceleration. It should be recognized that the principles disclosed in this specification may be applied to scanning devices that have rates of acceleration and deceleration other than those disclosed in FIG. 3A. Additionally, it should be recognized that the acceleration experienced by media 14 and the deceleration experienced by media 14 may be different. Furthermore, although FIG. 3A depicts constant deceleration and constant acceleration, it should be recognized that the principles disclosed in this specification are applicable to media 14 undergoing time varying acceleration and time varying deceleration. First segment 112 corresponds to movement of media 14 at the substantially constant speed of media 14 by the embodiment of the moving mechanism 23 prior to deceleration. Second segment 114 corresponds to deceleration of media 14 from the substantially constant speed of media 14 to a stop. Third segment 116 corresponds the time during which media 14 is stopped. Fourth segment 118 corresponds to the acceleration of media 14 from a stop to the substantially constant scanning speed of media 14. Fifth segment 120 corresponds to movement of media 14 at the substantially constant scanning speed of media 14.

The area beneath second segment 114 corresponds to the distance traveled by media 14 during deceleration from the substantially constant speed to a stop (i.e., the deceleration distance of media 14). The area beneath fourth segment 118 corresponds to the distance traveled by media 14 during acceleration from a stop to the substantially constant speed (i.e., the acceleration distance of media 14).

Figure 3B:
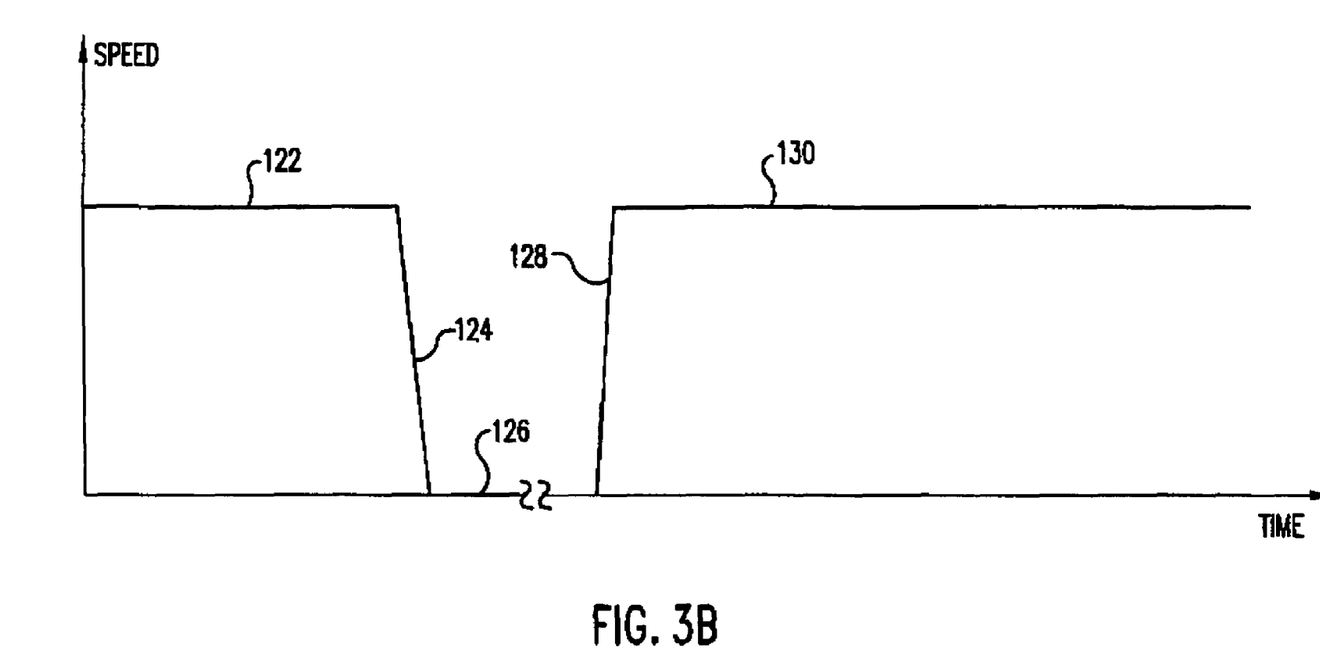

Shown in FIG. 3B is a graph representative of the speed of scan head 24 (and therefore the speed of contact image sensor 28) as it undergoes deceleration and acceleration. It should be recognized that the principles disclosed in this specification may be applied to scanning devices that have rates of acceleration and deceleration other than those disclosed in FIG. 3B. Additionally, it should be recognized that the acceleration experienced by scan head 24 and the deceleration experienced by scan head 24 may be different. Furthermore, although FIG. 3B depicts constant deceleration and constant acceleration, it should be recognized that scan head 24 may undergo time varying acceleration and time varying deceleration. First segment 122 corresponds to movement of scan head 24 by the embodiment of scanning mechanism 25 at the substantially constant speed of scan head 24 prior to deceleration. Second segment 124 corresponds to deceleration of scan head 24 from the substantially constant speed of scan head 24 to a stop. Third segment 126 corresponds the time during which scan head 24 is stopped. Fourth segment 128 corresponds to the acceleration of scan head 24 from stopped to the substantially constant speed of scan head 24. Fifth segment 130 corresponds to movement of scan head 24 at the substantially constant speed of scan head 24.

The area beneath second segment 124 corresponds to the distance traveled by scan head 24 (and therefore contact image sensor 28) during deceleration from the substantially constant speed to a stop (i.e., the deceleration distance of scan head 24). The area beneath fourth segment 128 corresponds to the distance traveled by scan head 24 during acceleration from a stop to the substantially constant speed (i.e., the acceleration distance of scan head 24).

Figures 4A, 4B:
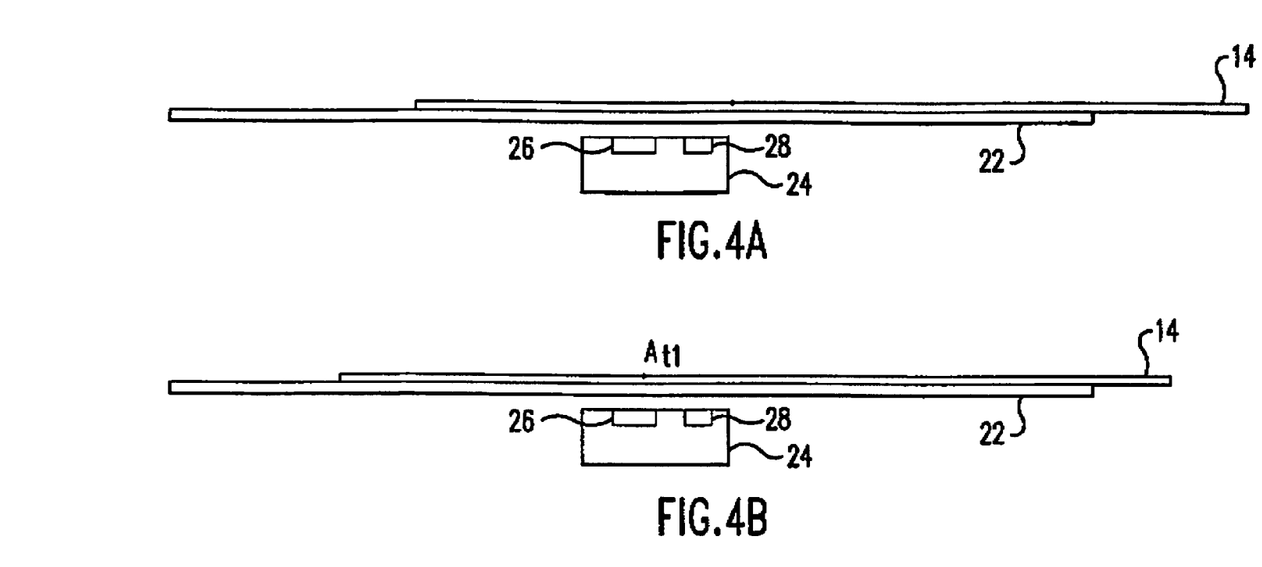
Figure 4C:
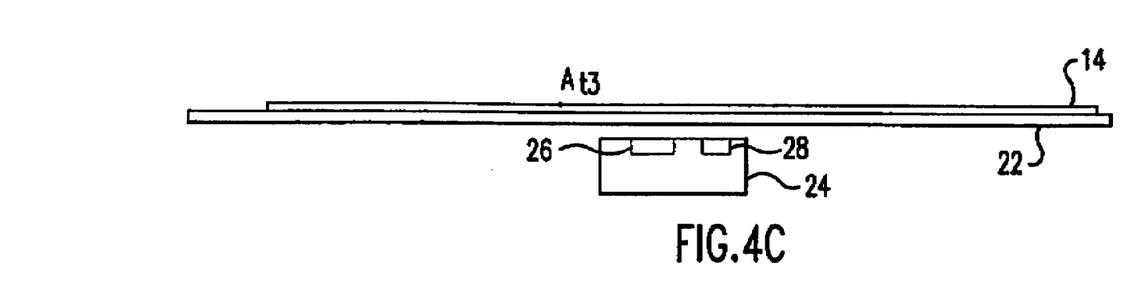

Shown in FIGS. 4A–4C are diagrams illustrating the movement of an arbitrary point A on media 14 (with scan head 24 staying in a fixed location over several intervals of time). In FIGS. 4A–4C, media 14 moves from right to left, the direction media 14 moves through scanner 10 during scanning. At time t0, scanner controller 16 sends a command to stop the movement of media 14 across transparent surface 22. At time t1, media 14 has stopped its movement across transparent surface 22. During this time period, point A moves from At0 to At1. The time interval between t0 and t1 corresponds to the time required for deceleration of media 14 from the substantially constant scanning speed to a stop. The distance traveled by point A during the time interval from t0 to t1 is representative of the deceleration distance of media 14. At some arbitrary time later t2 (after space as been created in the memory in scanner controller 16), point A begins to accelerate from a stop (from the position At1). At time t3, point A has accelerated to substantially equal the substantially constant scanning speed of media 14. During the time period from time t2 to time t3, point A moves from At1 to At3. The distance traveled by point A during the time period from t2 to t3 is representative of the acceleration distance of media 14.

Figure 5:
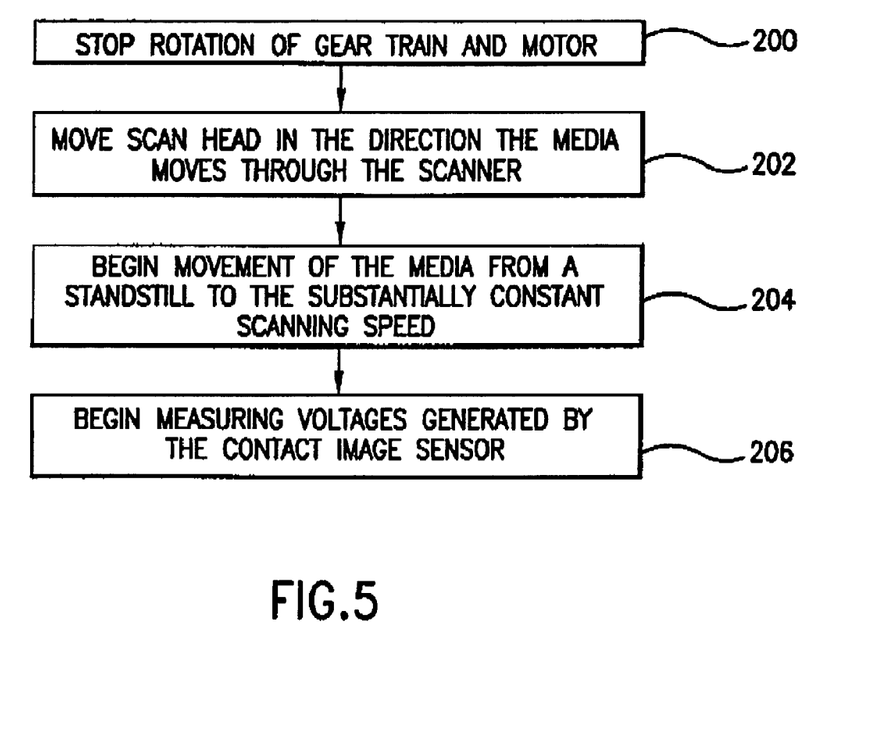

Shown in FIG. 5 is a high level flow diagram of a first method for using the hardware shown in FIG. 1 and FIG. 2 to reduce the artifacts arising from stopping and starting of media 14 during a scan. In a first step 200, scanner controller 16 actuates moving mechanism 23 to stop the rotation of gear train and motor 18. As previously mentioned, the scanning of media 14 may be stopped because space needs to be created in the memory in scanner controller 16 by sending its contents through interface 32 to computer 34. Next, in step 202, after media 14 stops moving, scanner controller 16 actuates scanning mechanism 25 to move scan head 24 (and thereby contact image sensor 28) along first guide 100 and second guide 102 in the direction media 14 moves through scanner 10 during scanning. Scan head 24 is moved by scanning mechanism 25 a distance substantially equal to the sum of the deceleration distance of media 14 and the acceleration distance of media 14. The distances required for media 14 to go from moving at the substantially constant speed to a stop and for media 14 to go from a stop to the substantially constant speed are stored in scanner controller 16. If the variability of these distances between scanners is relatively large, a calibration associated with each scanner could be performed to measure values of the acceleration distance and the deceleration distance of media 14. If the variability of these distances between scanners is relatively small, an average value of the acceleration distance and the deceleration distance could be used.

In step 204, scanner controller 16 actuates moving mechanism 23 to begin movement of media 14 from a stop to the substantially constant scanning speed. Media 14 reaches the substantially constant speed after moving the acceleration distance of media 14. Then, in step 206, scanner controller 16 begins measuring output voltages generated by contact image sensor 28 measuring the light reflected from the surface of media 14 (illumination device 26 has been previously illuminated by scanner controller 16). As media 14 continues to move over scan head 24 after traveling the acceleration distance of media 14, the section of media 14 that passed over scan head 24 during deceleration of media 14 prior to reaching a stop, again passes over scan head 24. The measurements made during the movement of this section of media 14 over scan head 24 at the substantially constant speed are used to replace those made on this section of media 14 when media 14 was undergoing deceleration, thereby reducing the artifacts resulting from the stopping and starting of media 14 during the scan. Alternatively, scanner controller 16 could cease measuring the voltages output from scan head 24 when scanner controller 16 actuates moving mechanism 23 to stop the rotation of gear train and motor 18 so the measurements made during deceleration need not be replaced. Media 14 continues moving at the substantially constant speed until the scanning of media 14 is complete. If it is necessary to stop the movement of media 14 again, the method shown in FIG. 5 can be repeated for the section of media 14 that passes over scan head 24 during deceleration.

In general, the repeatability with which scan head 24 can be positioned using scanning mechanism 25 is substantially greater than the repeatability of positioning media 14 using moving mechanism 23. Accordingly, it will, in general be less difficult to implement a system for the reduction of artifacts that relies upon the positioning capabilities of scanning mechanism 25 than one that relies upon the positioning capabilities of moving mechanism 23.

An alternative way in which the first method of reducing artifacts could be implemented includes keeping scan head 24 in one position and moving media 14 in a direction opposite that it moves during scanning. In this alternative, scanner controller 16 would actuate moving mechanism 23 to move media 14 a distance substantially equal to the sum of the deceleration distance and acceleration distance of media 14 in a direction opposite that which media 14 moves during scanning. Then, scanner controller 16 actuates moving mechanism 23 to move media 14 in the direction it moves during scanning at the substantially constant speed of media 14. After media 14 has reached the substantially constant speed, scanner controller 16 begins measuring the output voltages generated by contact image sensor 28.

The first method for reducing artifacts shown in FIG. 5 is well suited for a scanning device, such as scanner 10, for which there is sufficient length on media 14 (at any instant, in the direction of movement of media 14 through scanner 10 during scanning) available for scanning by scan head 24. For example, in scanner 10 during scanning, a sufficiently large length of media 14 contacts transparent surface 22 so that scan head 24 can travel far enough to use the method shown in FIG. 5 to reduce artifacts resulting from the stopping and starting of media 14. However, there are scanning devices in which the path followed by the media as it moves through the scanning device during scanning presents only a relatively small length of media 14 for scanning at any instant. For this type of scanning device, the method shown in FIG. 5 may not work well if multiple stops and starts are required during scanning.

Another possible way in which artifacts arising from starting and stopping media 14 may be reduced, involves scanning with scan head 24 while it is moving. Because scan head 24 is returned to its starting position after moving to scan media 14, this method can work with relatively short lengths of media 14 presented to transparent surface 22 for scanning. Additionally, because this method involves moving scan head 24 for scanning, allowance must be made for the distance required to accelerate scan head 24.

Figure 6:
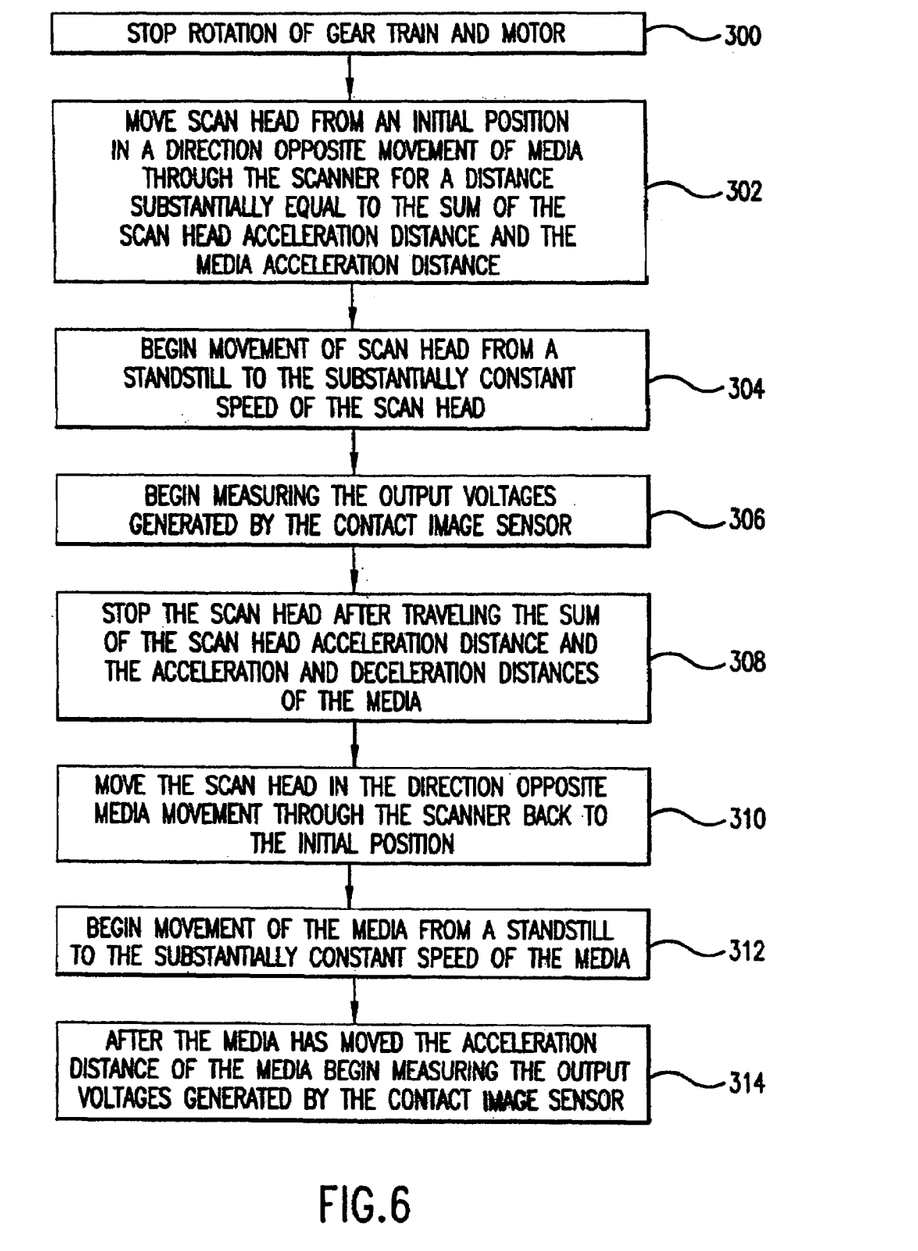

Shown in FIG. 6 is a high level flow diagram of a second method for reducing artifacts. Although the second method will be described in the context of using scanner 10, it should be recognized that the second method is particularly well suited to a scanning device for which there is a relatively short range of travel of the scan head or a scanning device in which a relatively short length of media is presented to the scan head at any instant.

Referring to FIG. 6, in a first step 300, scanner controller 16 actuates moving mechanism 23 to stop rotation of gear train and motor 18. Next, in step 302, after media 14 stops moving, scanner controller 16 actuates scanning mechanism 25 to move scan head 24 from an initial position in a direction opposite to the direction of movement of media 14 through scanner 10 along first guide 100 and second guide 102. Scan head 24 is moved a distance substantially equal to the sum of the acceleration distance of media 14 and the acceleration distance of scan head 24. The acceleration distance of scan head 24 is the distance necessary for scan head 24 to accelerate from a stop to a substantially constant speed (as depicted in FIG. 3B). It should be recognized that both the substantially constant speed and acceleration distance of scan head 24 may be different than for media 14. Furthermore, the acceleration rate of scan head 24 may be time varying. The acceleration distance for scan head 24, the acceleration distance for media 14, and the deceleration distance for media 14 are stored in scanner controller 16. If the variability of these distances between scanners is relatively large, a calibration associated with each scanner could be performed to measure values of these distances. If the variability of these distances between scanners is relatively small, average values of these distances may be used.

In step 304, scanner controller 16 actuates scanning mechanism 25 to begin movement of scan head 24 from a stop to the substantially constant speed of scan head 24 in the direction of movement of media 14 through scanner 10. Scan head 24 reaches its substantially constant speed after moving the acceleration distance of scan head 24. Then, in step 306, scanner controller 16 begins measuring the output voltages generated by contact image sensor 28 from the light reflected from media 14 (illumination device 26 was previously illuminated by scanner controller 16). As scan head 24 continues to move under media 14 after traveling the acceleration distance of scan head 24, it passes under the section of media 14 (having a length equal to the acceleration distance of media 14) that will pass over scan head 24 when media 14 is accelerated from stopped to the substantially constant speed. Then, scan head 24 moves under the section of media 14 (having a length equal to the deceleration distance of media 14) that passed over scan head 24 during deceleration of media 14 prior to reaching a stop.

Next, in step 308, after scan head 24 is moved past the sections of media 14 corresponding to the acceleration and deceleration distances of media 14, scanner controller 16 actuates scanning mechanism 25 to stop movement of scan head 24. The digital data generated by scanner controller 16 from the output voltages of contact image sensor 28 is associated with those sections of media 14 that undergo acceleration and deceleration while passing contact image sensor 28. The digital data corresponding to the deceleration section of media 14 is used to replace that collected during deceleration of media 14. The digital data corresponding to the acceleration section of media 14 is used in place of what would have been collected during acceleration of media 14. Then, in step 310, scanner controller 16 actuates scanning mechanism 25 to move scan head 24 in a direction opposite to the direction media 14 moves through scanner 10 back to the initial position. In moving back to the initial position, scan head 24 moves a distance substantially equal to the sum of the deceleration distance of scan head 24 and the deceleration distance of media 14. By moving scan head 24 back to the initial position, scanner 10 is prepared to repeat the second method of reducing artifacts if media 14 is stopped again before completion of scanning. Next, in step 312, scanner controller 16 actuates moving mechanism 23 to begin movement of media 14. Then, in step 314, after media 14 has moved the acceleration distance, scanner controller 16 begins measuring the voltages output by contact image sensor 28 that are generated by the light reflected from media 14 until the scanning of media 14 is complete.

In an alternative to the second method of reducing artifacts, scanner controller 16 actuates scanning mechanism 25 to move scan head 24 from the initial position in the direction media 14 moves through scanner 10 during scanning along first guide 100 and second guide 102. Scan head 24 is moved a distance substantially equal to the sum of the deceleration distance of media 14 and the acceleration distance of scan head 24. Then scanner controller 16 actuates scanning mechanism 25 to move scan head 24 under media 14 in a direction opposite the direction media 14 moves during scanning. Scan head 12 is moved for a distance substantially equal to the sum of the deceleration distance of media 14 and the acceleration distance of media 14 at the substantially constant speed of scan head 24 to generate digital data for the sections of media 14 that pass by contact image sensor 28 during deceleration, prior to stopping, and during acceleration, after starting. The digital data generated from the movement of scan head 24 under media 14 replaces that collected during the deceleration of media 14 and is used for what would have been collected during the acceleration of media 14. Scan head 24 is stopped after passing under the section of media 14 that will be accelerated past scan head 24 when movement of media 14 is restarted. Then, scanner controller actuates moving mechanism 25 to move scan head 24, in the direction media 14 moves during scanning, to the nominal position.

Although several embodiments of the invention have been illustrated, and their forms described, it is readily apparent to those of ordinary skill in the art that various modifications may be made to these embodiments without departing from the spirit of the invention or from the scope of the appended claims.

What is claimed is:

1. A system, comprising:
   a moving mechanism to selectively move the object at a first substantially constant speed during scanning;
   a scanning mechanism including an optical sensor, with the scanning mechanism to selectively move the optical sensor at a second substantially constant speed during the scanning; and
   a controller configured to replace first data from measurement of reflected light from a first section of the object, corresponding to a deceleration distance of the object, during deceleration of the object, with second data from measurement of reflected light from the first section, the controller including a configuration to actuate the scanning mechanism to move the optical sensor in a first direction the object moves during the scanning for a first distance substantially equal to a sum of the deceleration distance of the object and an acceleration distance of the object, the controller including a configuration to actuate the moving mechanism to move the first section of the object past the optical sensor at the first substantially constant speed in the first direction, the controller including a configuration to actuate the moving mechanism to move the first section of the object past the optical sensor at the first substantially constant speed in the first direction, and the controller including a configuration to cause the measurement of the reflected light used to generate the second data from the first section with the optical sensor during the relative movement between the first section and the optical sensor at the first substantially constant speed.

2. The system as recited in claim 1, wherein:
   the object includes media.

3. A system comprising:
   a moving mechanism to selectively move the object at a first substantially constant speed during scanning;
   a scanning mechanism including an optical sensor, with the scanning mechanism to selectively move the optical sensor at a second substantially constant speed during the scanning; and
   a controller configured to replace first data from measurement of reflected light from a first section of the object, corresponding to a deceleration distance of the object, during deceleration of the object, with second data from measurement of reflected light from the first section;
   the controller includes a configuration to actuate the scanning mechanism to move the optical sensor in a first direction, opposite a second direction the object moves during scanning, for a first distance substantially equal to a sum of an acceleration distance of the optical sensor and an acceleration distance of the object, the controller including a configuration to actuate the scanning mechanism to move the optical sensor in the second direction for a second distance substantially equal to a sum of the acceleration distance of the object and the deceleration distance of the object at the second substantially constant speed, the controller including a configuration to cause the measurement of the reflected light used to generate the second data with the optical sensor from the first section of the object and from a second section of the object corresponding to the acceleration distance of the object, and the controller including a configuration to actuate the scanning mechanism to move the optical sensor in the first direction for a third distance substantially equal to a sum of a deceleration distance of the optical sensor and the deceleration distance of the object.

4. A system comprising:
   a moving mechanism to selectively move the object at a first substantially constant speed during scanning;
   a scanning mechanism including an optical sensor, with the scanning mechanism to selectively move the optical sensor at a second substantially constant speed during the scanning; and
   a controller configured to replace first data from measurement of reflected light from a first section of the object, corresponding to a deceleration distance of the object, during deceleration of the object, with second data from measurement of reflected light from the first section, the controller including a configuration to actuate the scanning mechanism to move the optical sensor in a first direction the object moves during scanning for a first distance substantially equal to a sum of the deceleration distance of the object and an acceleration distance of the optical sensor, the controller including a configuration to actuate the scanning mechanism to move the optical sensor in a second direction, opposite the first direction, for a second distance substantially equal to a sum of the deceleration distance of the object and an acceleration distance of the object at the second substantially constant speed, the controller including a configuration to cause the measurement of the reflected light used to generate the second data with the optical sensor from the first section of the object and from a second section of the object corresponding to the acceleration distance of the object, and the controller includes a configuration to actuate the scanning mechanism to move the optical sensor in the first direction for a third distance substantially equal to a deceleration distance of the optical sensor and the acceleration distance of the object.

5. A scanning device for generating a digital representation of an image on a medium, comprising:
   a scanning mechanism including an optical sensor with the scanning mechanism configured for selectively moving at a first substantially constant speed during scanning;
   a moving mechanism configured for selectively moving the medium at a second substantially constant speed during scanning;
   a controller configured to replace first data from measurement of reflected light from a first section of the medium, corresponding to a deceleration distance of the medium, during deceleration of the medium, with second data from measurement of reflected light from the first section, the controller including a configuration to actuate the scanning mechanism to move the optical sensor in a first direction the medium moves during the scanning for a first distance substantially equal to a sum of the deceleration distance of the medium and an acceleration distance of the medium, the controller including a configuration to actuate the moving mechanism to move a first section of the medium past the optical sensor at the first substantially constant speed in the first direction, and the controller including a configuration to cause the measurement of the reflected light used to generate the second data from the first section with the optical sensor during the relative movement between the first section and the optical sensor at the first substantially constant speed.

6. A scanning device for generating a digital representation of an image on a medium, comprising:
   a scanning mechanism including an optical sensor with the scanning mechanism configured for selectively moving at a first substantially constant speed during scanning;
   a moving mechanism configured for selectively moving the medium at a second substantially constant speed during scanning; and
   a controller configured to replace first data from measurement of reflected light from a first section of the medium, corresponding to a deceleration distance of the medium, during deceleration of the medium, with second data from measurement of reflected light from the first section, the controller including a configuration to actuate the scanning mechanism to move the optical sensor in a first direction, opposite a second direction the medium moves during scanning, for a first distance substantially equal to a sum of an acceleration distance of the medium and an acceleration distance of the optical sensor, the controller including a configuration to actuate the scanning mechanism to move the optical sensor in the second direction for a second distance substantially equal to a sum of the acceleration distance of the medium and the deceleration distance of the medium at the second substantially constant speed, the controller including a configuration to cause the measurement of reflected light used to generate the second data with the optical sensor from the first section of the medium and from a second section of the medium corresponding to the acceleration distance of the medium, and the controller including a configuration to actuate the scanning mechanism to move the optical sensor in the first direction for a third distance substantially equal to a sum of a deceleration distance of the optical sensor and the deceleration distance of the medium.

7. A scanning device for generating a digital representation of an image on a medium, comprising:
   a scanning mechanism including an optical sensor with the scanning mechanism configured for selectively moving at a first substantially constant speed during scanning;
   a moving mechanism configured for selectively moving the medium at a second substantially constant speed during scanning; and
   a controller configured to replace first data from measurement of reflected light from a first section of the medium, corresponding to a deceleration distance of the medium, during deceleration of the medium, with second data from measurement of reflected light from the first section, the controller including a configuration to actuate the scanning mechanism to move the optical sensor in a first direction the medium moves during scanning for a first distance substantially equal to a sum of an acceleration distance of the optical sensor and a deceleration distance of the medium, the controller including a configuration to actuate the scanning mechanism to move the optical sensor in a second direction, opposite the first direction, for a second distance substantially equal to the deceleration distance of the medium and an acceleration distance of the medium at the second substantially constant speed, the controller including a configuration to cause the measurement of the reflected light used to generate the second data with the optical sensor from the first section of the medium and from a second section of the medium corresponding to the acceleration distance of the medium, and the controller including a configuration to actuate the scanning mechanism to move the optical sensor in the first direction for a third distance substantially equal to a deceleration distance of the optical sensor and the acceleration distance of the medium.

* * * * *

UNITED STATES PATENT AND TRADEMARK OFFICE
CERTIFICATE OF CORRECTION

PATENT NO. : 7,301,680 B1 Page 1 of 1
APPLICATION NO. : 09/395262
DATED : November 27, 2007
INVENTOR(S) : Arlin R. Jones It is certified that error appears in the above-identified patent and that said Letters Patent is hereby corrected as shown below:

In column 10, line 32, in Claim 3, delete "includes" and insert -- including --, therefor.

In column 11, line 16, in Claim 4, delete "includes" and insert -- including --, therefor.

Signed and Sealed this

Seventeenth Day of June, 2008

JON W. DUDAS
*Director of the United States Patent and Trademark Office*